June 23, 1931.  J. A. RANKIN  1,811,186
MACHINE FOR SLICING FRESH MEAT
Filed Oct. 1, 1928  2 Sheets-Sheet 1
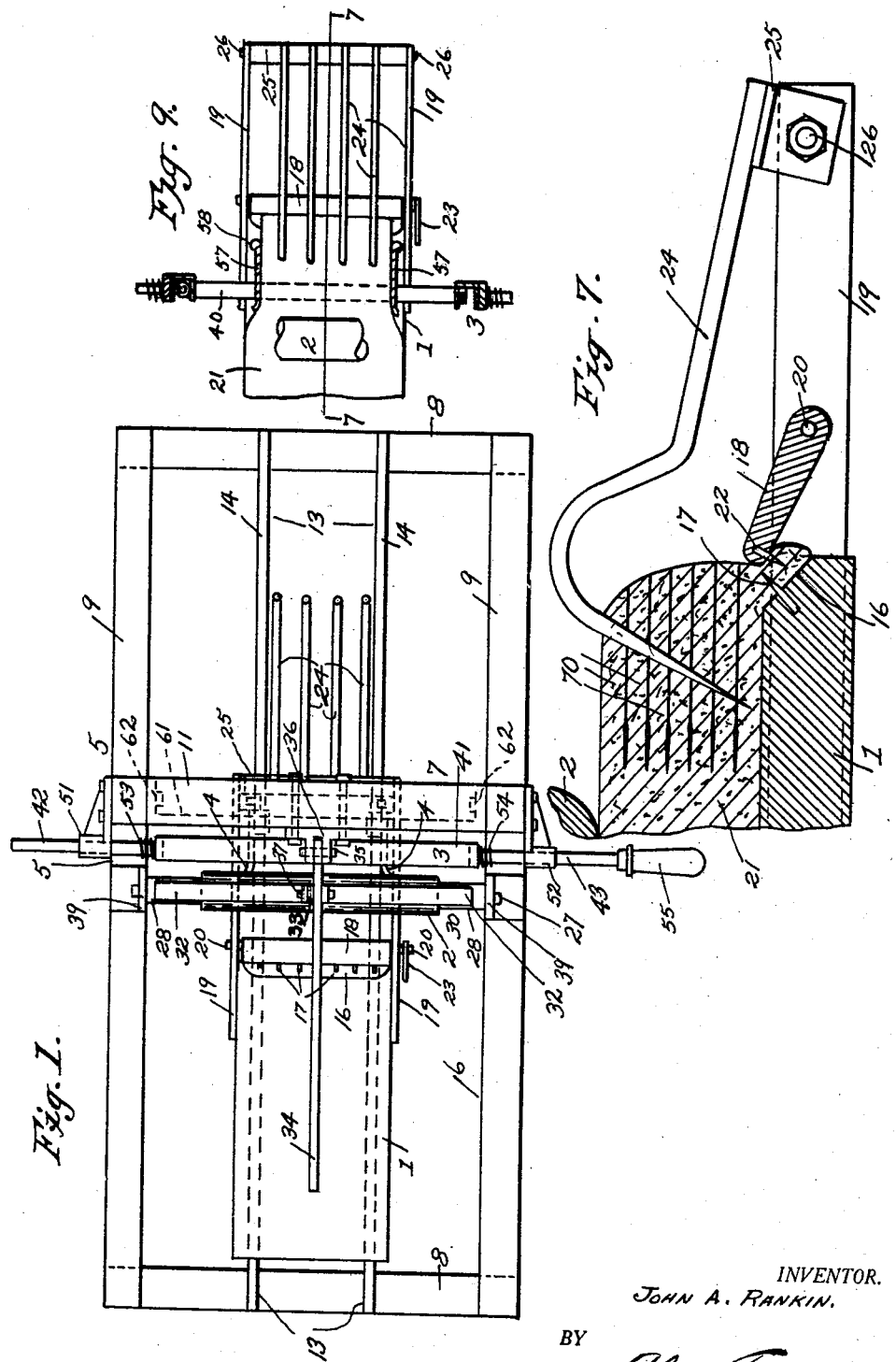
INVENTOR.
JOHN A. RANKIN.
BY
Alan Franklin
ATTORNEY.

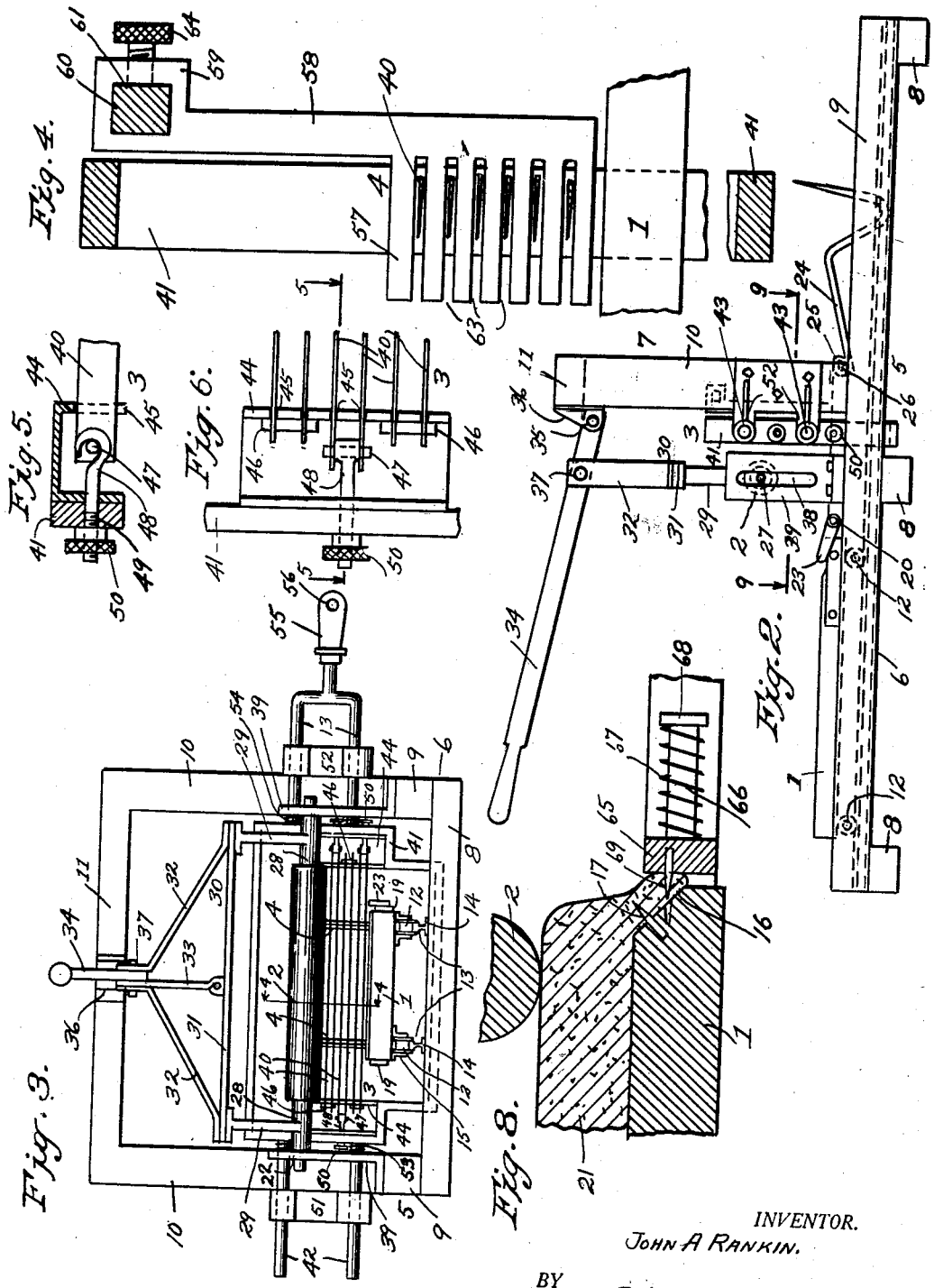

Patented June 23, 1931

1,811,186

UNITED STATES PATENT OFFICE

JOHN A. RANKIN, OF LOS ANGELES, CALIFORNIA

MACHINE FOR SLICING FRESH MEAT

Application filed October 1, 1928. Serial No. 309,423.

This invention relates to slicing machines, and more particularly to a machine for slicing fresh meat.

The general object of the invention is to provide a machine which will slice one or more slices of fresh meat cleanly and uniformly.

A more particular object is to provide a machine of the character stated which will be simple in construction, and highly practical and efficient in operation.

Other objects and advantages will appear hereinafter.

In this specification and the annexed drawings I disclose my invention in the form which I consider the best, but I do not limit my invention to such form, because it may be embodied in other forms, and it is to be understood that in and by the claims of this specification I intend to cover my invention in any form that it may be embodied.

Referring to the drawings,

Fig. 1 is a plan view of my meat slicing machine.

Fig. 2 is a side elevation of my meat slicing machine.

Fig. 3 is an end elevation of my meat slicing machine.

Fig. 4 is a longitudinal vertical section taken on line 4—4 of Fig. 3, showing the meat and knife guides.

Fig. 5 is a horizontal section taken on line 5—5 of Fig. 6.

Fig. 6 is a fragmentary rear view of one end of the slicing knife.

Fig. 7 is a fragmentary longitudinal section of the meat table showing a piece of meat on the table with its forward end sliced by the blades of the knife, and the forward end of the meat clamped on the forward end of the table and the forward ends of the slices of meat held by the meat hooks.

Fig. 8 is a fragmentary longitudinal section of the meat table with a piece of meat clamped thereon, with a modified form of clamp.

Figure 9 is a fragmentary sectional view taken on line 9—9 of Fig. 2, showing the meat clamped and hooked on the forward end of the meat table and in the act of being held on the table by the pressure roller while guided through the knife by the guides and sliced by the blades of the knife.

Corresponding parts are designated by the same reference characters in all the figures.

My invention includes generally a movable meat table 1, a pressure roller 2, a slicing knife 3, and meat guides 4.

The above described parts are mounted upon a main frame 5 which comprises a base frame member 6, and an upright frame member 7 extending transversely of the base member 6 intermediate of the ends thereof. The base frame member 6 comprises a plurality of transverse beams 8 and a pair of longitudinal side beams 9 mounted on said transverse beams. The upright frame member 7 comprises a pair of vertical beams 10, upstanding from the side beams 9 of the base frame member 6, and a transverse horizontal beam 11 mounted at its ends on the upper ends of said vertical beams.

The meat table 1 is slidably mounted by means of wheels 12 on a track 13 extending longitudinally and centrally of the base frame member, which track comprises a pair of T-rails 14 supported on the transverse beams 8 of the base frame member 6, on which rails the wheels 12 travel, said wheels being journaled in suitable bearings 15 secured to the under side of the meat table. The forward upper edge of the meat table is beveled as indicated at 16 and a plurality of prongs 17 spaced along said beveled edge project upwardly and rearwardly therefrom, at an angle. A meat clamp 18 is arranged forwardly of the meat table 1 between a pair of bearing bars 19 secured to the side edges respectively of said table, said clamp being pivoted at its forward edge at 20 to said bearing bars so that the rear edge of the clamp may swing over the beveled forward edge 16 of the meat table, to grip the forward edge of the meat 21 between the beveled edge of the meat table and rear edge of the clamp, the prongs 17 projecting upwardly through the forward edge of the meat and there being a plurality of prongs 22 projecting downwardly from the under side of the clamp near the rear edge thereof and spaced parallel to said edge for engaging the forward edge of the meat, thus clamping the forward edge of the meat firmly on the forward end of the meat table. An operating arm 23 is secured on one end of the pivot 20 outside one of the bearing bars 19 for operating the clamp 18. A plurality of meat hooks 24 are secured at their rear ends to a rock bar 25 which extends between the forward ends of the bearing bars 19 and is pivoted at its ends to said bearing bars at 26 whereby the hooks may be swung rearwardly to engage the forward end of the meat 21 when sliced by the knife 3 to hold the sliced portions, or swung forwardly to permit the meat table 1 to be drawn rearwardly beyond the knife and presser roller 2 for placing and clamping a piece of meat on the table for slicing.

The roller 2 is mounted on a roller shaft 27, the end portions of which are journaled in bearings 28 at the lower ends of the arms 29 of a roller frame 30, which frame also includes a horizontal beam 31 to which the upper ends of the arms 29 are secured, a pair of angle braces 32 secured at their lower ends to the ends of said horizontal beam and converging upwardly, and a vertical suspension bar 33 secured at its lower end to the horizontal beam 31 midway between its ends and extending upwardly between the upper ends of said braces. A roller operating arm 34 is pivoted at its forward end at 35 in a bearing 36 secured to the horizontal beam 11 of the upright frame member 7 and said arm extends between the upper end of one of the roller frame braces 32 and the vertical suspension bar 33 and is pivotally connected to the upper ends of said bar and both braces 32 by a pivot pin 37. The ends of the roller shaft 27 extend through a pair of guide slots 38 in a pair of guide plates 39 upstanding from the side beams 9 of the base frame member 6, whereby the roller 2 is guided vertically when swung up or down by the roller operating arm 34.

The knife 3 comprises one or more blades 40, a knife frame 41, and knife guide rods 42 and 43. In the ends of the knife frame 41 are secured a pair of U-shaped guide plates 44 provided with horizontal slots 45 extending from one edge through which slots said knives extend respectively. In the present embodiment of my invention I show six blades 40 arranged in spaced superimposed relation. The blades are preferably arranged in pairs, with the blades of each pair connected at their corresponding ends by pins 46 and 47 respectively. Hooks 48 engage the pins 47 between the blades held by said pins, which hooks extend out through the plates 44 and the end members of the knife frame 41 and the outer end portion of said hooks are provided with threads 49 to receive thumb nuts 50 which engage the outside of the end members of the knife frame and draw the blades lengthwise and the pins 46 at the other end of the blades against the guide plates 44 until the blades are taut and straight. The knife guide rods 42 and 43 extend through and reciprocate in bearings 51 and 52 mounted on the outside of the vertical uprights 10 of the upright frame member 7 of the main frame 5. Short bumper springs 53 and 54 surround the knife guide rods 42 and 43 respectively between the respective ends of the knife frame 41 and the bearings 51 and 52 respectively. A handle 55 is connected to the outer ends of the guide rods 43 for manually reciprocating the knife 3 and said handle has an aperture 56 in its outer end for connecting the handle to an electric motor or other power means (not shown) for reciprocating the knife by power.

Each of the meat guides 4 comprises a vertical guide plate 57 secured on a rod 58 depending from a sleeve 59 formed with a square opening 60 through which extends a square horizontal rod 61 secured at its ends at 62 to the uprights 10 of the transverse upright frame member 7. The guide plates 57 extend longitudinally of the main frame 5 and parallel to the meat table 1 through the knife frame 41 and said plates are provided with a plurality of superimposed horizontal slots 63 extending from their rear edges through which slots extend the blades 40 respectively. The guides 4 may be adjusted closer together or further apart for guiding therebetween the meat 21 on the table 1, by moving the sleeves 59 along the rod 60 and the guides may be secured in adjusted position by means of set screws 64 threaded in said sleeves which screws bind against the rod 59.

The modified form of meat clamp shown in Fig. 8 comprises a clamp bar 65 slidably mounted at the forward end of the meat table 1 on pins 66 secured in said forward end of the table and projecting forwardly therefrom, which bar is urged toward said end of the meat table by springs 67 surrounding said pins 66 and bearing at one end against the clamp bar and at their other ends against heads 68 on the outer ends of said pins. Prongs 69 are secured in the clamp bar 65 and project rearwardly therefrom. The forward end of the meat 21 is clamped upon the forward beveled edge 16 of the meat table 1 by the clamp bar 65 under the influence of the springs 67 and the meat is further held by the table prongs 17 and the clamp bar prongs 69 which project into the forward end of the meat.

The operation of my invention is as follows:

The meat table 1 being moved to a position rearwardly of the knife 3 and roller 2 as shown in Figs. 1 and 2, and the clamp 18 and hooks 24 being swung away from the forward edge of the table, a piece of meat 21 is placed on the table, with its forward end resting upon the forward beveled edge 16 of the table and the prongs 17 projecting into said forward end of the meat, and the clamp 18 is swung rearwardly until its rear edge engages and clamps the forward end of the meat against said forward beveled edge of the table and the clamp prongs 22 engage said forward end of the meat. (See Fig. 7.) The roller 2 being raised the table 1, with the meat thereon, is manually pushed along the tracks 14 under the roller until the forward end of the meat engages the rear cutting edges of the knife blades 40. The roller 2 is then lowered and pressed down upon the meat with the proper force by means of the roller operating arm 34, and the roller is held in such position. The knife 3 is then reciprocated manually by means of the handle 55, or by power means connected to the handle, while the forward ends of the table and meat are pushed under the depressed roller 2 and through the knife 3, whereby the forward end of the meat is sliced into a plurality of slices as shown in Fig. 7. The hooks 24 are then swung over until their points project into the forward end of the meat and hold the forward ends of the slices 70, of the meat, which are cut by the knife blades 40. The reciprocation of the knife being continued, and the table being pushed under the roller 2 and forward until the meat passes all the way under the roller 2 and through the knife 3, the meat is thus sliced cleanly and uniformly from end to end by the knife blades 40 into the slices 70 of uniform thickness throughout extending the full length of the meat. The hooks 24 and clamp 18 being swung out of engagement with the forward end of the meat, the sliced meat may be removed from the table.

I claim as my invention:

1. A meat slicing machine comprising a knife, a movable table on which the meat is placed and sliced when the table is moved under the knife, and hooks for engaging the sliced forward end of the meat when said end of the meat passes through the knife.

2. A meat slicing machine comprising a knife, a movable table on which the meat is placed and sliced when the table is moved under the knife, a clamp for clamping the forward end of the meat on the table, and hooks for engaging the sliced forward end of the meat when said end of the meat passes through said knife.

3. In a meat slicing machine, a knife, a movable table on which the meat is placed and sliced when the table is moved under said knife and a clamp pivotally mounted forwardly of the forward end of said table for clamping the forward end of the meat upon the forward end of the table.

4. In a meat slicing machine, a knife, a movable table on which the meat is placed and sliced when the table is moved under said knife, and a clamp pivotally mounted forwardly of the forward end of said table for clamping the forward end of the meat upon the forward end of the table, prongs on the forward end of the table and prongs on said clamp for engaging the forward end of the meat when clamped on the forward end of the table.

5. A meat slicing machine comprising a table for holding a piece of meat, pressure means for pressing the meat on the table, knives for slicing the pressed meat into thin slices, and means for holding down the forward sliced end of the meat on said table when the knives have sliced through said end of the meat.

6. A meat slicing machine comprising a table for holding a piece of meat, a clamp for clamping the forward end of the meat on said table, pressure means for pressing the meat on the table, knives for slicing the pressed meat into thin slices, and means for holding down the forward sliced end of the meat on the table when the knives have sliced through said end of the meat.

JOHN A. RANKIN.